(12) United States Patent  (10) Patent No.: US 9,194,709 B1
Popa  (45) Date of Patent: Nov. 24, 2015

(54) DEVICE AND METHOD FOR TRANSMITTING VEHICLE POSITION DATA

(71) Applicant: Razvan Popa, Timis (RO)

(72) Inventor: Razvan Popa, Timis (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/282,741

(22) Filed: May 20, 2014

(30) Foreign Application Priority Data

Apr. 30, 2014 (EP) .................................. 14465504

(51) Int. Cl.
*G08G 1/00* (2006.01)
*G01C 21/26* (2006.01)

(52) U.S. Cl.
CPC ..................................... *G01C 21/26* (2013.01)

(58) Field of Classification Search
USPC ................... 701/400, 408, 412, 468, 38, 522
See application file for complete search history.

(56) References Cited

U.S. PATENT DOCUMENTS

| 6,285,953 | B1 | 9/2001 | Harrison et al. |
| 2004/0162673 | A1 | 8/2004 | Murray et al. |
| 2011/0077816 | A1* | 3/2011 | Biondo et al. ................... 701/33 |
| 2013/0141429 | A1* | 6/2013 | Sakakibara ................... 345/419 |
| 2014/0040434 | A1 | 2/2014 | Rybak et al. |

FOREIGN PATENT DOCUMENTS

NO    WO 2007/070137    6/2007

* cited by examiner

*Primary Examiner* — Yonel Beaulieu
(74) *Attorney, Agent, or Firm* — Cozen O'Connor

(57) ABSTRACT

A position detection and transmission device for a vehicle includes a position detection unit that detects a position of the vehicle, a control unit that receives position data from the position detection unit, and a transmission unit, coupled to the control unit, that transmits the position data processed by the control unit to a receiving unit. The control unit determines a difference between an initial position value and each one of the subsequent position values, respectively, and provides the initial position value and the respective difference between the initial position value and each one of the subsequent position values to the transmission unit for transmission to the receiving unit.

13 Claims, 2 Drawing Sheets

DEVICE AND METHOD FOR TRANSMITTING VEHICLE POSITION DATA

BACKGROUND OF THE INVENTION

1. Field of the Invention

The invention relates to the field of automotive applications. In particular, the invention relates to a position detection and transmission device for a vehicle and a method for detecting and transmitting a position of a vehicle, a vehicle comprising the position detection and transmission device, a program element, and a computer-readable medium.

2. Description of the Related Art

Position detection devices can be used to track the motion profile of vehicles. In land vehicles, such position detection devices may in particular be used to determine the route and/or the distance driven in a particular geographic region. The position data acquired by the position detection device may be used for automatically determining an amount of taxes to be paid by the vehicle owner, for example.

An example of such an automatic system for determining the amount of taxes to be paid is the International Fuel Tax Agreement (IFTA), that implements automatic data recording. The data recording and transmission is carried out by a recording device installed in a participating vehicle and used to track the position and the motion of the vehicle. The recording device records tracking data at a certain sampling rate. Each sample contains the vehicle odometer value, latitude of the vehicle's position, and longitude of the vehicle's position when the sampling occurs. Such a sample may further include a timestamp value along with the odometer value, latitude value, and longitude value.

The vehicle odometer value is stored in the binary format and using 3 bytes, i.e., 3*8 bit=24 bit with one bit representing a predetermined distance value, for example 1 km or 1 mile (=1.609 km). The vehicle odometer value may be stored as an unsigned binary integer value.

Each of the latitude and the longitude is stored in the binary format and using 4 bytes (32 bits) with one bit representing 10E-7 degree, for example. These values may be stored as a signed integer value in two's complements format.

The timestamp value may be stored in the binary format using 4 bytes in the unix time representation with a resolution of one second.

The vehicle odometer value, latitude, and longitude are being transmitted cyclically to a receiving station which collects the tracking data from all recording devices and which stores these data in a database in order to create reports for determining the taxes.

For transmitting the tracking data from the recording device to the receiving station, a data transmission link or communication channel between these elements is required. Usually, the communication channel is a GPRS/UMTS/LTE wireless connection and the data is transmitted on a periodically basis.

For transmitting one sample of the tracking data (odometer value, longitude, latitude), at least 11 bytes may be required in the abovementioned example (3 bytes odometer value, 4 bytes latitude, 4 bytes longitude).

SUMMARY OF THE INVENTION

An object of the present invention to provide a position detection and transmission device that reduces the costs for transferring data between a recording device and a receiving station.

According to an aspect of the invention, a position detection and transmission device for a vehicle comprises a position detection unit, a control unit, and a transmission unit. The position detection unit is configured to detect a position of the vehicle. The control unit is configured for receiving position data from the position detection unit. The transmission unit is coupled to the control unit and configured to transmit the position data processed by the control unit to a receiving unit. The position data received by the control unit comprises a multitude of position values. The control unit is further configured for determining a difference between an initial position value and each one of the subsequent position values, respectively, and for providing the initial position value and the respective difference between the initial position value and each one of the subsequent position values to the transmission unit for transmission to the receiving unit.

That is, the initial position value and each one of the subsequent position values corresponds to at least one part (odometer value and/or longitude and/or latitude) of one sample of tracking data of a vehicle. The initial position value is transmitted as an absolute value, whereas the subsequent position values are transmitted as differential values or delta values with respect to the initial position value.

Therefore, instead of transmitting every sample or position data as an absolute value, the second and subsequent values are transmitted as delta values, which may reduce the numeric range of the values. The reduced numeric range leads to a reduction of the required bandwidth for transmitting the delta values. The reduced bandwidth may lead to fewer costs for transmission of the data.

For example, the absolute value of any one of the longitude and latitude may require 4 bytes of binary symbols (=32 bits). The delta value between the second position value and the initial position value can be transmitted using 2 bytes of binary symbols (=16 bits), which leads to reduction of the required bandwidth for transmitting the position data.

When referring to a byte in the context of this description and unless indicating otherwise, a byte comprises 8 binary bits.

The transmission unit is in particular configured to transmit the position data processed by the control unit to a receiving unit via a wireless data connection, more particularly via a GPRS, UMTS, or LTE communication path.

The position detection unit may comprise a GPS (global positioning system) module for cyclically determining the position of the vehicle. The control unit may be configured to cyclically request the position data from the position detection unit. Alternatively, the position detection unit may cyclically provide the position data to the control unit.

The receiving unit may be any kind of external receiving station for further processing the received data, such that the external receiving station is located remote to the position detection and transmission device.

Additionally to the position data, a start timestamp may be provided, which indicates the start time of the initial position data, i.e., the time when the initial sample occurred. The time stamp may be stored and transmitted using 4 bytes of binary information and may indicate, for example, the number of seconds elapsed since Jan. 1, 1970, 0:00 h with a gain of 1 bit per second. When transmitting the timestamp value as a delta value for the delta position values, 2 bytes (16 bits) may be used therefore with a resolution of one second such that the bandwidth for this transmission is also reduced compared to the initial timestamp format of 4 bytes. By including the delta timestamp, a track and trace functionality may be provided in which for each position from the trace the corresponding time information is stored.

According to an embodiment of the invention, the control unit is configured to determine a longitude and a latitude for each one of the multitude of the position values. The control unit is further configured to determine a difference between the longitude and the latitude of the initial position value and the longitude and the latitude of each one of the subsequent position values, respectively.

In general, the delta values are determined as follows, with the index n in round brackets indicating the number of a sample:

$$\text{longitude}(n)-\text{longitude}(1)=\text{delta}(n)$$

This example is given with reference to the longitude and applies similarly to the vehicle odometer value and latitude.

According to a further embodiment of the invention, the position detection and transmission device further comprises a vehicle interconnection interface. The position detection and transmission device is configured to cyclically query a vehicle odometer value via the vehicle interconnection interface. The control unit is further configured to assign an initial vehicle odometer value to the initial position value and a difference between the initial vehicle odometer value and each one of subsequent odometer values to the respective subsequent position value.

This enables detection of the driven distance additionally to determining the route via the position data.

According to a further embodiment of the invention, the control unit is configured to query position data from the position detection unit when the vehicle odometer value increases by a predetermined distance value.

Thus, a regular interval is provided for determining the position data, the regular interval being based on the distance driven by the vehicle.

According to a further embodiment of the invention, the control unit is configured to provide the initial position value and 255 subsequent position values as a difference value with respect to the initial position value and then provides a second initial position value and subsequent position values as a difference value with respect to the second initial value.

The delta odometer value is transmitted using 1 byte (8 bit). 8 binary bits can be used to represent 256 different numbers. Thus, after transmitting the initial sample with an absolute vehicle odometer value, a corresponding number of samples of subsequent delta odometer values and respective delta position values can be transmitted using reduced bandwidth.

According to a further embodiment of the invention, the control unit is configured to use 8 bytes for the initial position value and 4 bytes for the difference between the initial position value and each one of the subsequent position values. The delta latitude and the delta longitude are transmitted using 2 bytes (16 binary bits), respectively.

According to a further embodiment of the invention, the control unit is configured to use 3 bytes for the initial vehicle odometer value and 1 byte for the difference between the initial vehicle odometer value and each one of the subsequent position values.

After having transmitted the first initial sample using absolute values and the subsequent samples using all possible delta values according to the number of bits of the delta odometer value, a second sample using absolute values is transmitted and the subsequent values are transmitted as delta or differential values with respect to the second sample using absolute values. Thus, the number of bits of the delta odometer value can be kept low (8 binary bits in this example) while regularly sending a sample using absolute values and refer the subsequent delta samples to the last sent absolute sample.

The control unit may further comprise a storage element configured to store the initial sample and the delta values of all subsequent samples as well as further absolute samples and subsequent samples of the further absolute samples. The initial sample and any one of the further absolute samples may comprise a timestamp (sample time of the respective sample) using 4 byte, the absolute vehicle odometer value using 3 byte, the latitude using 4 byte, the longitude using 4 byte. Delta samples may be provided with a list entries number, which may be a counter indicating the order of the delta samples with reference to the previous initial sample. Further, a delta sample may comprise the delta odometer value using 1 byte, the delta latitude using 2 byte and the delta longitude using 2 byte. If the delta odometer value reaches the maximum possible representable number with 8 bits, a second absolute sample is stored again and subsequent delta samples are stored with reference to the second absolute sample.

The sampled data may be transmitted once a day at a predetermined time to the receiving unit such that it may be required to store the samples until they are transmitted to the receiving unit.

The required storage capacity of the storage element may be reduced similarly to the reduction of the transmission bandwidth for transmitting the delta samples.

The required storage capacity and transmission bandwidth may be reduced about 50% compared to storing and transmitting every sample as an absolute value sample. As transmission of data via communication links may be liable to charges depending on the transmitted amount of data (number of bits), the reduction of the amount of transmitted data may lead to an important economic benefit.

According to a further aspect of the invention, a vehicle is provided which comprises a position detection and transmission device as described above and hereinafter.

The vehicle may in particular be a land vehicle, in particular a commercial vehicle like a truck.

According to a further aspect of the invention, a method for detecting and transmitting a position of a vehicle is provided. The method comprises detecting a first position of a vehicle; determining a first position value corresponding to the first position of the vehicle; transmitting the first position value to a receiving unit; detecting a second position of the vehicle; determining a second position value corresponding to the second position of the vehicle; determining a difference between the second position value and the first position value; and transmitting the difference between the second position value and the first position value to the receiving unit.

The first and second position value may be a sample as described above and may comprise a longitude and/or a latitude of a vehicle position.

The method is carried out in accordance with the configuration of the position detection and transmission device described above. In particular, the first position value may be transmitted as an absolute value wherein the second position value and each one of the subsequent position values may be transmitted as a differential or delta value with respect to the first position value such that a bandwidth required for transmitting the subsequent position value is reduced as fewer bits are used for transmitting the delta values compared to the transmission of the absolute values.

According to an embodiment of the invention, the method further comprises detecting a first vehicle odometer value and transmitting the first vehicle odometer value to the receiving unit together with the first position value.

According to a further embodiment of the invention, the method further comprises detecting a second vehicle odometer value, wherein the second position of the vehicle is detected if the difference between the second vehicle odometer value and the first vehicle odometer value is greater than a predetermined value.

The vehicle odometer value may be detected after a predetermined time period. In case the second vehicle odometer value is greater than a predetermined value (for example 1 km or 1 mile (=1.609 km)), the position of the vehicle is detected and processed by the control unit. Alternatively, the control unit my continuously monitor the vehicle odometer value and may query the position data in case the vehicle odometer value is greater than the predetermined value.

According to a further embodiment of the invention, the method further comprises determining a difference between the second vehicle odometer value and the first vehicle odometer value and transmitting the difference between the second vehicle odometer value and the first vehicle odometer value to the receiving unit together with the difference between the second position value and the first position value.

According to a further embodiment of the invention, 4 bytes are used for transmitting the difference between the second position value and the first position value to the receiving unit.

According to a further aspect of the invention, a computer-readable medium is provided, on which a program is stored. When the program is executed on one or several processors of a position detection and transmission device, the device is instructed to perform the method steps as described with reference to one aspect and corresponding embodiments of the invention.

A computer-readable medium may be a floppy disk, a hard disk, a CD, a DVD, an USB (Universal Serial Bus) storage device, a RAM (Random Access Memory), a ROM (Read Only Memory), an EPROM (Erasable Programmable Read Only Memory), and an EEPROM (Electrically Erasable Programmable Read Only Memory). A computer-readable medium may also be a network node coupled to a data communication network, for example the Internet, which allows downloading a program code from the network node.

These and other aspects of the present invention will become apparent from and elucidated with reference to the exemplary embodiments described hereinafter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the present invention will now be described, with reference to the following drawings, in which.

DETAILED DESCRIPTION OF THE PRESENTLY PREFERRED EMBODIMENTS

Figure 1:
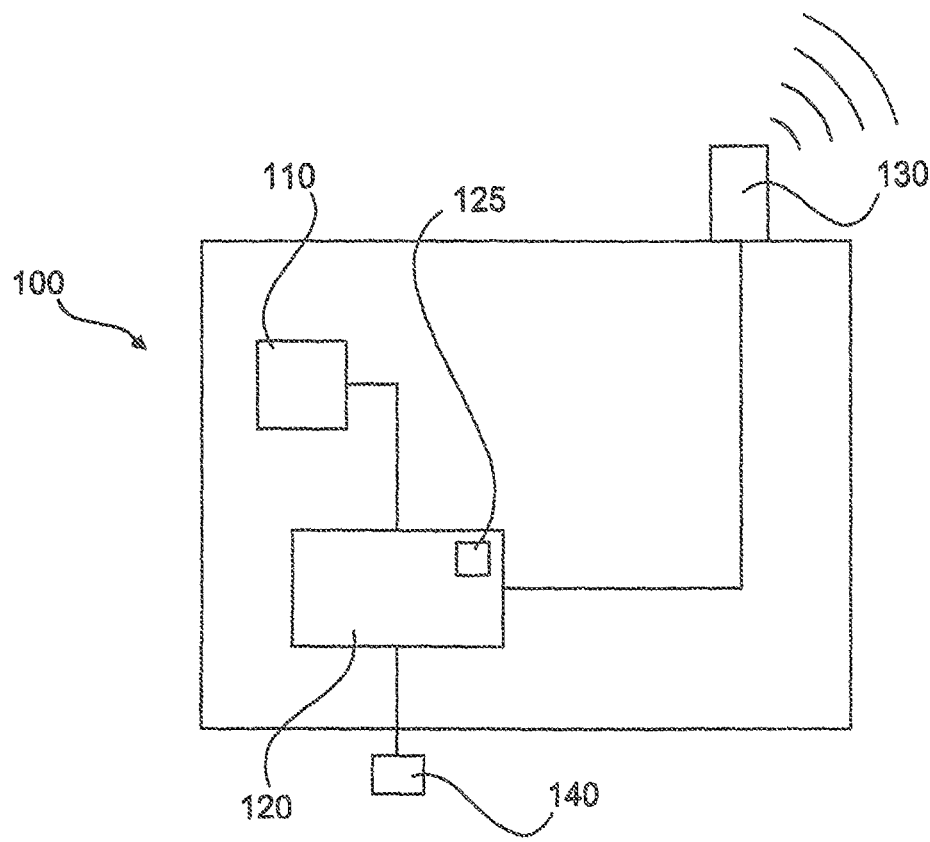
FIG. 1 shows a position detection and transmission device for a vehicle according to an exemplary embodiment of the invention.

The illustration provided in the accompanying drawings is schematic and not to scale. In different drawings, similar or identical elements or steps are provided with the same reference numerals.

The following detailed description is merely exemplary in nature and is not intended to limit the application and uses.

FIG. 1 illustrates a position detection and transmission device 100. The position detection and transmission device 100 comprises a position detection unit 110, a control unit 120, a transmission unit 130, and a vehicle interconnection interface 140.

The position detection unit 110 is configured to detect the position of a vehicle to which the position detection and transmission device 100 is attached. The position detection unit 110 provides sample values to the control unit 120, wherein each of these sample values comprises a latitude and a longitude.

The vehicle interconnection interface 140 is configured to receive and/or query parameters from the vehicle like, for example, the odometer value of the vehicle.

Both the vehicle parameters and the position data are processed by the control unit 120, which processes these sample values as described above.

The control unit 120 comprises a storage element 125 that stores the sample values and is interconnected to the transmission device 130 for providing the stored sample values to the transmission device 130.

The transmission device may be a communication module for initiating a data link or data connection to a communication path. In particular, the transmission device is an antenna for establishing a wireless connection to a communication network. More particularly, the transmission device is a GPRS-module, an UMTS-module, or an LTE-module.

Figure 2:
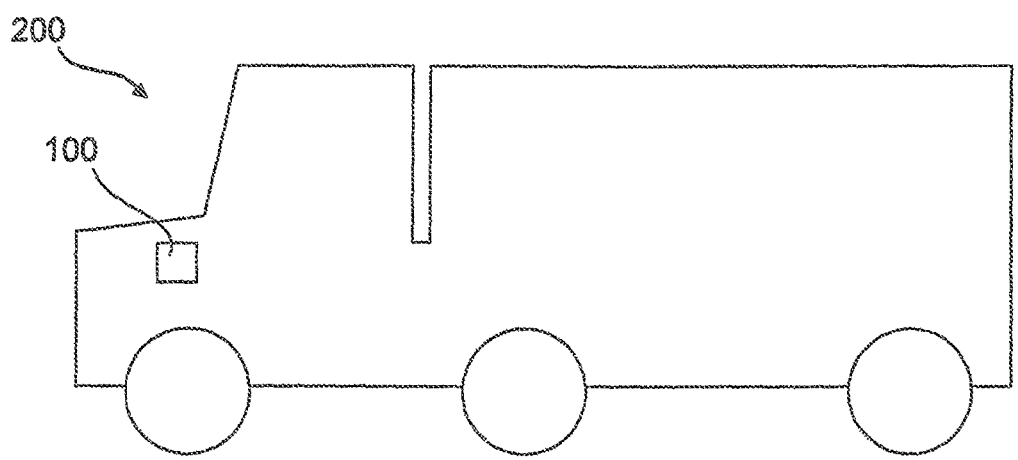
FIG. 2 shows a vehicle with a position detection and transmission device according to an exemplary embodiment of the invention.

FIG. 2 illustrates a vehicle 200 with a position detection and transmission device 100.

The position detection and transmission device 100 is mechanically attached to the vehicle 200 and is functionally interconnected with the vehicle via the vehicle interconnection interface 140 so as to receive parameters from the vehicle.

Figure 3:
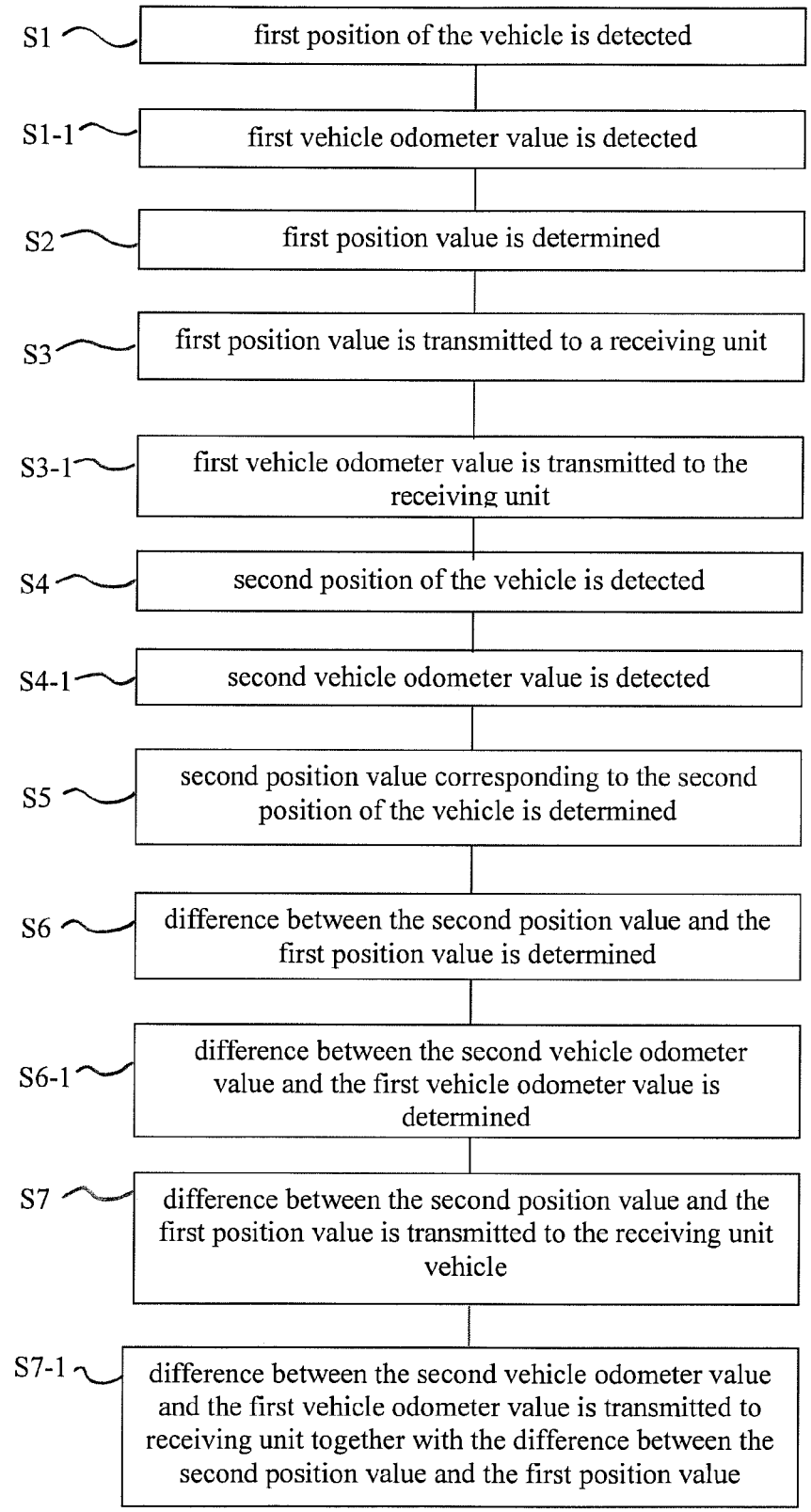
FIG. 3 schematically indicates the steps of a method for detecting and transmitting position data of a vehicle according to an exemplary embodiment of the invention.

FIG. 3 schematically illustrates the steps according to an exemplary embodiment of the method according to the invention.

In a first step S1, a first position of the vehicle is detected. Additionally, in a step S1-1 a first vehicle odometer value is detected. In a subsequent step S2, a first position value, corresponding to the first position of the vehicle, is determined. The first position value may in particular comprise a longitude and a latitude value.

In a step S3 the first position value is transmitted to a receiving unit. In a step S3-1, the first vehicle odometer value is transmitted to the receiving unit. It should be noted that the steps S3 and S3-1 may be carried out in one step, i.e., transmitting the first position value and the first vehicle odometer value together with the first position value, or immediately subsequent to each other. The step S3-1 may be a sub-step of step S3.

In a step S4, a second position of the vehicle is detected. In a step S4-1 a second vehicle odometer value is detected, wherein the second position of the vehicle is detected if the difference between the second vehicle odometer value and the first vehicle odometer value (delta odometer value) is greater than a predetermined value. In other words, if the difference between the second vehicle odometer value and the first vehicle odometer value is less than a predetermined value (threshold), the second position of the vehicle is not requested from the position detection unit. Thus, it may be facilitated to sample position data after a predetermined distance driven by the vehicle. The step S4-1 may be carried out cyclically, wherein the step S4 is carried out only when the condition defined in step S4-1 (second vehicle odometer value—first vehicle odometer value >=threshold) is met.

Similarly to steps S1 and S2, a second position value corresponding to the second position of the vehicle is determined in step S5. In a step S6, a difference between the second position value and the first position value (delta longitude and/or delta latitude) is determined. This difference corresponds to the delta values mentioned above. In a step S6-1, a difference between the second vehicle odometer value and the first vehicle odometer value is determined. The step S6-1 may be a sub-step of step S6 such that a subsequent sample is defined by the delta odometer value, delta longitude, and delta latitude.

In a step S7, the difference between the second position value and the first position value is transmitted to the receiving unit. In a step S7-1, the difference between the second vehicle odometer value and the first vehicle odometer value is transmitted to the receiving unit together with the difference between the second position value and the first position value.

It should be noted that instead of transmitting the sample data to the receiving unit immediately after having completed one sample (odometer value, latitude, longitude), all detected and determined sample data may be stored first in the storage element of the control unit and the transmission steps S3, S3-1, S7, S7-1 of the method may be carried out later on as parts of a single transmission process for all sample data.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A position detection and transmission device (100) for a vehicle (200), the position detection and transmission device (100) comprising:
    a position detection unit (110) configured to detect a position of the vehicle;
    a control unit (120) configured to receive position data from the position detection unit; and
    a transmission unit (130) coupled to the control unit and configured to transmit the position data processed by the control unit (120) to a receiving unit,
    wherein the position data received by the control unit comprises a multitude of position values, and wherein
    the control unit (120) is further configured to determine a difference between an initial position value from among the multitude of position values and each one of subsequent position values from among the multitude of position values, respectively, and to provide transmission information representative of the multitude of position values, the transmission information comprising an absolute value representative of the initial position value and a plurality of delta values each representative of the respective difference between the initial position value and each one of the subsequent position values, the absolute value being represented by data of a first size and each delta value being represented by data of a second size, the first size being larger than the second size, and
    data of the first size representative of the absolute value and plural units of data of the second size, each representative of a respective delta value, are provided to the transmission unit (130) for transmission to the receiving unit.

2. The position detection and transmission device (100) according to claim 1,
    wherein the control unit (120) is configured to determine a longitude and a latitude for each one of the multitude of the position values, and
    wherein the control unit (120) is further configured to determine the delta values based upon a difference between the longitude and the latitude of the initial position value and the longitude and the latitude of each one of the subsequent position values, respectively.

3. The position detection and transmission device (100) according to claim 1,
    further comprising a vehicle interconnection interface (140),
    wherein the position detection and transmission device (100) is configured to cyclically query a vehicle odometer value via the vehicle interconnection interface;
    wherein the control unit (120) is configured to assign an initial vehicle odometer value to the initial position value and a difference between the initial vehicle odometer value and each one of subsequent odometer values to the respective subsequent position value.

4. The position detection and transmission device (100) according to claim 3,
    wherein the control unit (120) is configured to query position data from the position detection unit (110) when the vehicle odometer value increases by a predetermined distance value.

5. The position detection and transmission device (100) according to claim 1,
    wherein the control unit (120) is configured to provide the absolute value representative of the initial position value and the plurality of delta values each representative of the subsequent position values and then provide a second absolute value representative of a second initial position value and plurality of second delta values each representative of subsequent position values as a difference value with respect to the second initial position value.

6. The position detection and transmission device (100) according to claim 1,
    wherein the control unit is configured to use 8 bytes as the first size and 4 bytes as the second size.

7. The position detection and transmission device (100) according to claim 3,
    wherein the control unit is configured to use 3 bytes for the initial vehicle odometer value and 1 byte for the difference between the initial vehicle odometer value and each one of the subsequent position values.

8. A method for detecting and transmitting a position of a vehicle, the method comprising:

detecting (S1) a first position of a vehicle;
determining (S2) a first position value corresponding to the first position of the vehicle;
transmitting (S3) an absolute value representative of the first position value to a receiving unit, the absolute value being represented by data of a first size;
detecting (S4) a second position of the vehicle;
determining (S5) a second position value corresponding to the second position of the vehicle;
determining (S6) a difference between the second position value and the first position value; and
transmitting (S7) a delta value representative of the difference between the second position value and the first position value to the receiving unit, the delta value being represented by data of a second size, the second size being smaller than the first size.

9. The method according to claim 8,
wherein the method further comprises:
detecting (S1-1) a first vehicle odometer value; and
transmitting (S3-1) the first vehicle odometer value to the receiving unit together with the first position value.

10. The method according to claim 9,
wherein the method further comprises:
detecting (S4-1) a second vehicle odometer value,
wherein the second position of the vehicle is detected (S4) if the difference between the second vehicle odometer value and the first vehicle odometer value is greater than a predetermined value.

11. The method according to claim 10,
wherein the method further comprises:
determining (S6-1) a difference between the second vehicle odometer value and the first vehicle odometer value; and
transmitting (S7-1) the difference between the second vehicle odometer value and the first vehicle odometer value to the receiving unit together with the difference between the second position value and the first position value.

12. The method according to claim 8,
wherein the second size is 4 bytes.

13. A computer-readable medium storing program code of a program, which, when executed on one or several processors of a position detection and transmission device, instructs the device to perform the method steps of claim 8.

* * * * *